United States Patent [19]

Takeuchi

[11] Patent Number: 5,475,269

[45] Date of Patent: Dec. 12, 1995

[54] METHOD OF CONTROLLING A VEHICLE SAFETY DEVICE

[75] Inventor: Kunihiro Takeuchi, Gumma, Japan

[73] Assignee: Airbag Systems Company, Ltd., Tomioka, Japan

[21] Appl. No.: 123,103

[22] Filed: Sep. 20, 1993

[30] Foreign Application Priority Data

Sep. 25, 1992 [JP] Japan .................................. 4-280580

[51] Int. Cl.⁶ .................................................. B60R 21/32
[52] U.S. Cl. ........................ 307/10.1; 180/282; 280/735; 340/436
[58] Field of Search .................................. 307/9.1, 10.1; 180/271, 274, 282; 280/734, 735; 340/436, 438, 440, 669

[56] References Cited

U.S. PATENT DOCUMENTS

| | | | |
|---|---|---|---|
| 3,931,527 | 1/1976 | Oishi et al. | 280/735 |
| 5,045,835 | 9/1991 | Masegi et al. | 340/436 |
| 5,101,192 | 3/1992 | Ishizuka | 340/436 |
| 5,155,376 | 10/1992 | Okano | 307/10.1 |
| 5,204,547 | 4/1993 | Schumacher et al. | 340/436 |
| 5,283,472 | 2/1994 | Takeuchi et al. | 307/10.1 |

FOREIGN PATENT DOCUMENTS 3-246139  1/1991  Japan .
3-79450   4/1991  Japan .

*Primary Examiner*—William M. Shoop, Jr.
*Assistant Examiner*—Richard T. Elms
*Attorney, Agent, or Firm*—Fish & Richardson

[57] ABSTRACT

A control system for a vehicle safety device comprises an operation circuit in which a main switching element, an activator, and a safety switch are connected, in series, to a condenser for accumulating electric power. When a vehicle collision has occurred, the safety switch is turned on and the main switching element is turned on in response to a vehicle collision judgment which is made in accordance with a signal from an acceleration sensor. As a result, electric current is supplied to the activator to activate the vehicle safety device. The main switching element is turned off when a time period where an output of an operation instruction signal for actuating the main switching element and the ON-state of the safety switch are realized reaches a preset time period.

4 Claims, 3 Drawing Sheets

METHOD OF CONTROLLING A VEHICLE SAFETY DEVICE

BACKGROUND OF THE INVENTION

This invention relates to a system for controlling vehicle safety devices such as an air bag, a seat belt tightening device and the like.

Recently, in order to ensure the safety of motor vehicle passengers, various safety devices such as an air bag, a seat belt fastening device and the like have been . It must be assured for all of these safety devices that they are ignited at the time when a vehicle collision has occurred, and that they are not ignited accidentally when a vehicle is normally running.

As disclosed in U.S. Pat. No. 5,155,376, in a conventional air bag device, a squib operation circuit is provided between a battery which is mounted on a vehicle and the ground. This squib operation circuit comprises a transistor (main switching means), a squib (activator) for an air bag, and a safety switch, all arranged in series. When electric current is supplied to the squib, the latter is ignited to inflate or expand the air bag.

The above control system further comprises an acceleration sensor for detecting the acceleration of the vehicle, and a microcomputer for judging whether or not a vehicle collision has occurred in accordance with data from the acceleration sensor. When the microcomputer judges that the vehicle collision has occurred, it outputs an operation instruction signal to turn on the above transistor in order to provide electric current to the squib.

The safety switch is designed such that when the vehicle is in a normal running condition, the safety switch is held in an OFF-state so that electric current may not flow to the squib, and the safety switch is turned on in response to an impact with a lower level than that of an impact in response to which the microcomputer may judge that a vehicle collision has occurred. Owing to this arrangement, even if the operation instruction signal is outputted as a result of runaway of the microcomputer and the transistor is turned on when the vehicle is in the normal traveling condition, the air bag can be prevented from being accidentally expanded because the safety switch is kept in the OFF-state.

Also connected to the operation circuit for the squib is a condenser with a large capacity which can be charged by the battery. Since the squib operation circuit works by using the condenser as a power source even in the event where the harness between the squib operation circuit and the battery is cut off at the time when the vehicle collision has occurred, the air bag is assuredly made to expand.

The above condenser is also acts as a backup power source for the use of the microcomputer. As a consequence, even in the event where the harness of the battery is cut off as mentioned above, continued operation of the microcomputer is ensured.

It is desirable that the microcomputer limits the time period for the transistor to be kept in the ON-state (i.e., the time period for providing electric current to the squib) to the time period required for the ignition of the squib. The reasons are as follows. Presuming that the harness of the battery is cut off at the time the vehicle collision has occurred, if the time period for supplying electric current to the squib is too long, the electric load of the condenser is consumed by the supply of electric current to the squib. As a result, the condenser may become unable to act as the backup power source for the use of the microcomputer. The result is that the microcomputer may not operate any further, thus making it impossible for the microcomputer to write the record of controlling the air bag into a non-volatile memory, for example.

In the above control system, the safety switch is duly expected to be in the ON-state during a preset time period where the transistor is held in the ON-state. The reason is that the safety switch is turned on by an impact with a lower level than that of the impact in response to which the microcomputer judges that a vehicle collision has occurred. In this way, only when both the transistor and safety device are in the ON-states, electric current is supplied to the squib to expand the air bag. However, depending on the types or conditions of vehicle collision, there are instances where the safety device is repeatedly turned on and off due to chattering. Nevertheless the transistor is in the ON-state, and no electric current is supplied to the squib as long as the safety device is in the OFF-state. Accordingly, if the time period for holding the transistor in the ON-state is set too short without taking into consideration the time period where the safety switch is in the OFF-state, there is a possibility, in the worst case, that electric current is not supplied to the squib for a long time enough and as a result, the air bag is not expanded.

For this reason, actually, the time period for outputting the operation instruction signal is obliged to be set longer than the time period required for expanding the air bag taking into consideration the possible chattering of the safety switch. This attempt, however, brings about another problem in that if the chattering does not occur to the safety switch at the time when the vehicle collision has occurred, electric current is supplied to the squib for a longer time than that required for expanding the air bag. This results in a large consumption of electric power being accumulated in the condenser. As a consequence, it is necessary to make the capacity of the condenser large enough to store sufficient electric power write the record of the controlling of the air bag into the nonvolatile memory after the supply of electric current to the squib.

The related art, e.g., Japanese Early Laid-Open Patent Application No. 246139/91 (corresponding to U.S. patent application Ser. No. 07/651626, issued as U.S. Pat. No. 5,283,472) discloses a means for judging the condition of the safety switch. According to this art, if it is judged that the safety switch is in the ON-state at the same time when it is judged that an acceleration sensor is subjected to a failure, an operation instruction signal is outputted to a transistor and as a result, an air bag is expanded. Japanese Early Laid-Open Patent Application No. 79450/1991 also discloses a means for checking the condition of a safety switch. According to this prior art, when an actual condition of the safety switch is different from the condition of the safety switch which can be expected when the safety switch is in a normal condition, it is judged that the safety switch is subjected to a failure. U.S. Pat. No. 5,101,192 discloses that a microcomputer stores failure judgment data, etc. of an air bag system is stored in a non-volatile memory and electric power of a condenser is consumed for this storing operation.

SUMMARY OF THE INVENTION

It is therefore an object of the present invention to provide a control system, in which electric current can be supplied to an activator for a time period just long enough to activate a vehicle safety device in spite of the chattering of a safety switch, thereby the vehicle safety device can assuredly be activated when a vehicle collision has occurred, electric power of a condenser is not wastefully consumed so that the condenser may be used as a power source after the activation of the safety device, and the condenser can be made small.

According to the present invention, there is provided a control system for a vehicle safety device, comprising:

(a) an acceleration sensor for detecting acceleration acting on a vehicle;

(b) collision judgment means for judging whether or not a vehicle collision has occurred in accordance with acceleration data from the acceleration sensor;

(c) operation instruction signal output means for outputting an operation instruction signal in response to the judgment of a vehicle collision made by the vehicle collision judgment means;

(d) an operation circuit including main switching means which is turned on in response to the operation instruction signal, and a safety switch which is turned on by an impact of the vehicle, both arranged in series relative to each other and in series relative to an activator for the vehicle safety device;

(e) a condenser connected, as a power source, to the operation circuit;

(f) switch condition judgment means for detecting an operating condition of the safety switch;

(G) time period counting means for counting a time period where the operation instruction signal output means are outputting the operation instruction signals and the switch condition judgment means judges that the safety switch is in the ON-state, and providing such counted time as an electric current supplying time period; and (h) operation finish instruction means for turning off the main switching means when the electric current supplying time period counted by the time period counting means reaches a preset time period.

DETAILED DESCRIPTION OF THE EMBODIMENT

Figure 1:
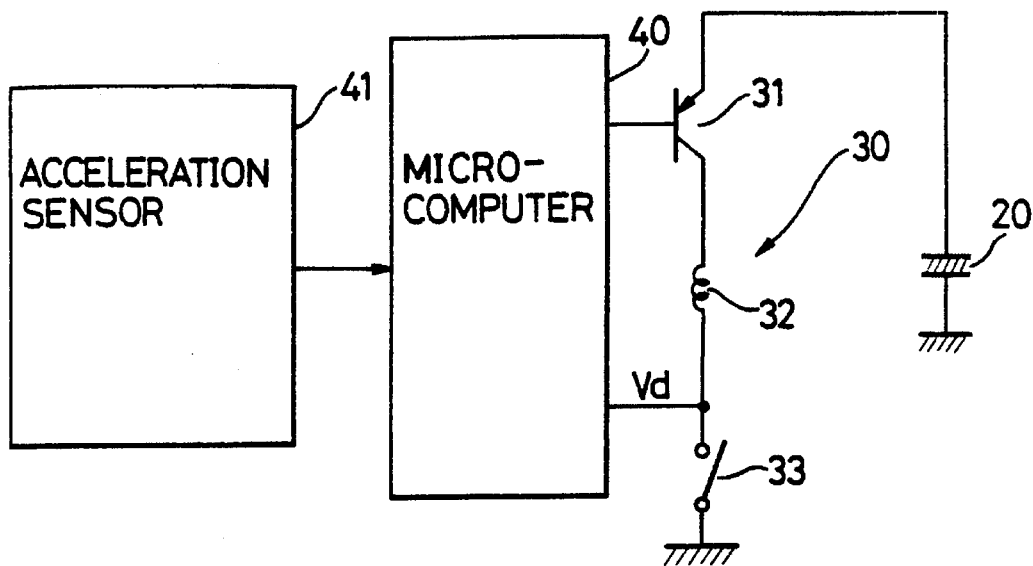
FIG. 1 is a circuit diagram showing one embodiment of a control system according to the present invention.

The present invention will now be described with reference to the drawings. FIG. 1 shows a circuit diagram of a control system for an air bag (vehicle safety device). This control system comprises a squib operation circuit 30 provided between a condenser 20 and the ground. The squib operation circuit 30 includes a transistor 31 (main switching means), a squib 32 for the air bag (activator for the vehicle safety device), and a safety switch 33, all arranged in series in this order from the condenser 20. As disclosed in the above U.S. Pat. No. 5,101,192, the condenser 20 is connected to a battery (not shown) through a voltage increasing circuit.

As disclosed in U.S. Pat. No. 5,283,472, the above safety switch 33 comprises, for example, an elongated lead switch, a magnet movable along the lead switch, and a spring for biasing the magnet. As it will be described later, the magnet moves against the spring by an impact with a lower level than that of an impact in response to which a microcomputer 40 may judge that a vehicle collision has occurred, and as a result, the safety switch 33 is turned on. On a vehicle, the safety switch 33 is located in generally the same position as an acceleration sensor 41 which will be described later. The control system further comprises a microcomputer 40. Inputted into this microcomputer 40 through an A/D converter (not shown) is a signal from an acceleration sensor 41 adapted to detect the acceleration of the vehicle. In accordance with data coming from the acceleration sensor 41, the microcomputer 40 judges whether or not a vehicle collision has occurred. When the judgment is made in the affirmative, the microcomputer 41 outputs an operation instruction signal (trigger signal) to the transistor 31 in order to turn on the transistor 31. By receipt of a terminal voltage Vd of the safety device 33, the microcomputer 40 can know the operating condition of the safety switch 33.

Figure 2:
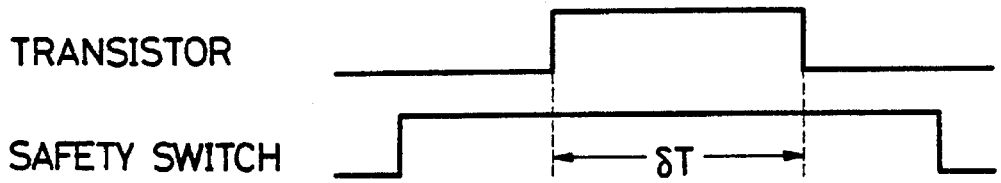
FIG. 2 is a time chart showing the operating conditions of the transistor and safety device when the safety device is not subjected to chattering and a harness of a battery is cut off at the time when a vehicle collision has occurred.

The procedure for controlling the transistor 31 carried out by the microcomputer 40 will now be described with reference to FIGS. 2 and 3.

At the time when a vehicle collision has occurred, the microcomputer 40 controls, while watching the condition of the safety switch 33, the transistor 31 such that electric current will be supplied to the squib 32 for a preset time period. At the time when a vehicle collision has occurred, the safety switch 33 is usually continuously held in the ON-state for a comparatively long period of time as shown in FIG. 2. In that case, as shown in FIG. 2, the microcomputer 40 causes the transistor 31 to be turned on and maintains it in the ON-state continuously for a preset time period ($\delta T$). As a consequence, electric current is supplied to the squib 32 for the preset time period ($\delta T$). The preset time period ($\delta T$) is 3 ms which is just enough to ensure the ignition of the squib 32 and which is not longer than necessary.

Figure 3:
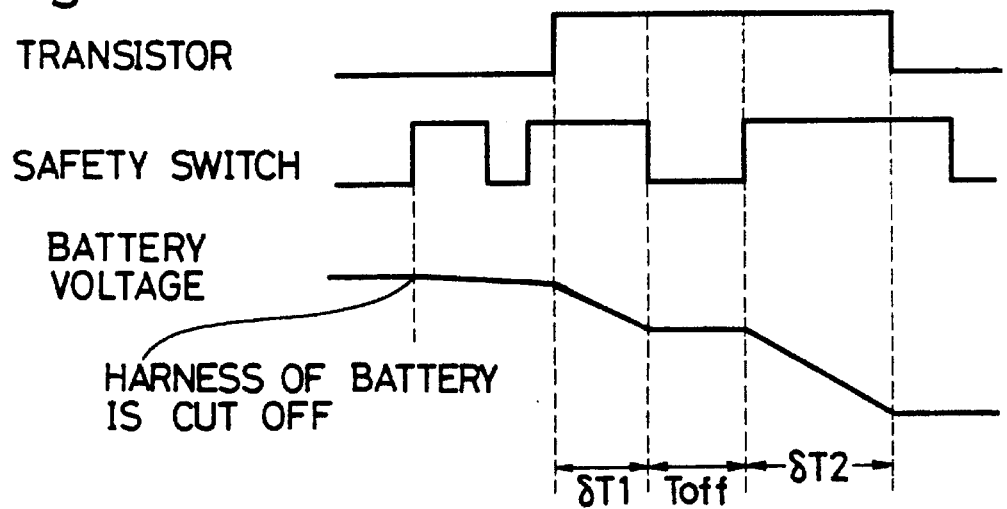
FIG. 3 is a time chart showing the operating conditions of the transistor and safety switch as well as the change in voltage of a condenser when the safety switch is subjected to chattering and the harness of a battery is cut off at the time when a vehicle collision has occurred.

Depending on the types or conditions of the vehicle collision, the safety switch 33 is irregularly repeatedly turned on and off at comparatively small time intervals, as shown in FIG. 3, caused by chattering. In that case, the microcomputer 40 recognizes the time period during which both the transistor 31 and safety switch 33 are in the ON-state (this time period is indicated by $\delta T1$ and $\delta T2$) as a time period for supplying electric current to the squib 32. The microcomputer 40 is operated to maintain the transistor 31 in the ON-state until the total of $\delta T1$ and $\delta T2$ becomes the preset time period ($\delta T$). When this total reaches the preset time period, the microcomputer 40 turns off the transistor 31. The microcomputer 40 recognizes the time period during which the safety switch 33 is in the OFF-state (this time period is indicated by Toff) as a time period during which no current is actually supplied to the squib 32. In this way, even though the safety switch 33 is subjected to chattering, electric current can assuredly be supplied to the squib 32 for the preset time period, thus enabling the squib 32 to assuredly expand the air bag.

Next, presuming that a vehicle collision has occurred causing the harness (which connects the battery and the condenser 20 to each other) to be cut off and the safety switch 33 to be subjected to chattering, the change in voltage of the condenser 20 will be described with reference to FIG. 3. When the harness of the battery is cut off, it is only the condenser 20 that can be used as the power source after that incident.

From the time when the harness of the battery is cut off to the time when the transistor 31 is turned on, the electric current of the condenser 20 is consumed by only the microcomputer 40, and therefore the voltage of the condenser 20 is gradually reduced. During the time period ($\delta T1$) where both the transistor 31 and safety switch 33 are in the ON-state, the squib 32 also consumes the electric power of the condenser 20, and therefore the voltage of the condenser 20 is abruptly reduced. During the time period (Toff) where the safety switch 33 is in the OFF-state, the electric power is consumed by only the microcomputer 40 and is not consumed by the squib 32, and therefore the change in voltage of the condenser 20 becomes gradual again. During the time period ($\delta T2$) where both the transistor 31 and safety switch 33 are in the ON-state again, the voltage of the condenser 20 is abruptly reduced again. After the transistor 31 is turned off, the voltage of the condenser 20 is gradually reduced because the electric power is consumed by only the microcomputer 40. In this way, since the time period for supplying electric current to the squib 32 (this requires a large consumption of electric power) is limited to the preset time period necessary for expanding the air bag, the voltage of the condenser 20 is maintained at a level sufficient to operate microcomputer 40. As a result, it can be ensured that the record of the controlling is written into the non-volatile memory by the computer 40, for example.

A timer interrupt program for supplying electric current to the squib (this program is periodically executed by the microcomputer 40) will now be described with reference to a flow chart of FIG. 4. First, in Step 101, it is judged whether or not a flag TE is set. This flag TE represents the finish of the operation for supplying electric current to the squib 32 (in other words, the finish of the expansion of the air bag.). Since the flag TE is not set until the finish of the expansion of the air bag, the judgment result in Step 101 becomes "NO", and the program proceeds to Step 102. In Step 102, it is judged whether or not a flag TG is set. This flag TG represents the fact that the collision judgment is made. Since the flag TG is not set until the collision judgment is made, the judgment result in Step 102 becomes "NO" and the program proceeds to Step 103.

In Step 103, the acceleration signal from the acceleration sensor 41 is inputted. Then, the acceleration is integrated in Step 104. In the next Step 105, the integral value of the acceleration and the preset threshold value are compared with each other in order to judge whether or not a vehicle collision has occurred. If it is judged that the integral value of the acceleration does not exceed the threshold value (that is, a vehicle collision has not occurred), the program returns to the main program. During a normal running, the above Steps 101 to 105 are periodically repeatedly executed. When a vehicle collision has occurred, the integral value of the acceleration is increased in the decelerating direction to exceed the threshold value. Therefore, it is judged "YES" in Step 105 and the program proceeds to Step 106. In Step 106, the flag TG is set and then the program proceeds to Step 107. In the next program cycle, since it is judged "YES" in Step 102 and since the program proceeds to Step 107, it is not necessary to repeatedly execute Steps 103 to 105. In Step 107, the transistor 31 is turned on (this means an output of an operation instruction signal or trigger signal).

Next, in Step 108, it is judged whether or not the safety switch 33 is turned on. If the judgment result is "YES", the program proceeds to Step 109 where the timer counter (TC) is counted up. In other words, only when both the transistor 31 and safety switch 33 are in the ON-state, the time for supplying electric current to the squib 32 is counted recognizing that electric current is being supplied to the squib 32. If the judgment result in Step 108 is that the transistor 31 is in the OFF-state, the time counting in Step 109 is skipped recognizing that the safety switch 33 is subjected to chattering, etc., and the program returns to the main program. In Step 110 subsequent to Step 109, it is judged whether or not the value of the counter (TC) reaches the preset value (corresponding to the previously-mentioned preset time period $\delta T$). If the judgment result in Step 110 is "NO", the program returns to the main program. In this way, Steps 101, 102, and 107 to 110 are repeatedly executed until the time period for supplying electric current to the squib 32 reaches the preset time period.

When the time period for supplying electric current to the squib 32 reaches the preset time period, the judgment is made in the affirmative in Step 110 and the program proceeds to Step 111. In Step 111, the transistor 31 is turned off. As a result, the supply of electric current to the squib 32 of the air bag device is finished. Next, in Step 112, a flag TE is set. In the next Step 113, the record for controlling of the air bag is stored. That is, the conditions of the flags TE and TG are written in a non-volatile memory such as, for example, EEPROM or the like. If both the flags TE and TG are set, for example, it can be known the facts that a vehicle collision has occurred and electric current has been supplied to the squib 32. This is helpful for finding out the reason why the air bag has not been expanded at the time when the vehicle collision has occurred. After Step 113 has been executed, the program returns to the main program.

In Step 101 of the next program cycle, since the flag TE is already set, the judgment is made in the affirmative and the program returns to the main program skipping all other Steps. As a consequence, the supply of electric current to the squib 32 can be prevented no matter what situation occurs thereafter. For example, when double collisions have occurred, the supply of electric current to the squib 32 is made only when the first vehicle collision has occurred, and therefore no supply of electric current to the squib 32 is made when the second vehicle collision has occurred. Owing to this arrangement, the electric power of the condenser 20 is not consumed by a supply of electric current to the squib which would otherwise be made when the second vehicle collision has occurred, and it can be secured as a backup power source for other uses.

Another embodiment of the present invention will now be described with reference to a flow chart of FIG. 5. In this embodiment, Steps 101 to 107 and 111 to 113 of FIG. 4 are executed, and Steps 201 to 205 of FIG. 5 are executed instead of Steps 108 to 110 of FIG. 4. That is to say, when the transistor 31 is turned on in Step 107, the program proceeds to the next Step 201. Here, a timer counter (TA) is counted up. The time period during which the transistor 31 is in the ON-state is counted by this timer counter (TA). In the next Step 202, a switching condition of the safety switch 33 is judged. Here, if the switching condition is OFF, the program proceeds to Step 203 where another timer counter (TB) is counted up. By this timer counter (TB), the time period is counted up where the transistor is in the ON-state but the safety switch 33 is in the OFF-state. If the safety switch 33 is in the ON-state, the program proceeds to Step 204 where a value of the counter (TB) is subtracted from the counter (TA) to obtain a subtracted value X. This subtracted value X represents an actual time period for supplying electric current to the squib 32 which is obtained by the condition where both the transistor is in the ON-state and safety switch 33 is in the ON-state. In the next Step 205, it is judged whether or not the value of the subtracted value X reaches the preset value N. If the judgment result is "YES", the program proceeds to Step 111 where the transistor 31 is turned off to finish the supply of electric current to the squib 32.

As apparent from the above description, the calculation of the subtracted value X refers to a recognition of the actual time period for supplying electric current to the squib 32 as well as a counting of that time period recognized.

Still another embodiment will be described with reference to a flow chart of FIG. 6. In this embodiment, all Steps 101 to 113 of FIG. 4 are executed. However, in this embodiment, the preset value N in Step 110 of FIG. 4 is replaced by a required electric current supplying time period N'. This required electric current supplying time period N' represents a current supplying time period still required at that time point. Its initial value is equal to the preset value N of the embodiment of FIG. 4. In this embodiment, if the judgment in Step 108 is made in the negative, Steps 301 to 302 are executed and then the program returns to the main program. That is to say, in Step 108, it is judged as to the condition of the safety switch 33. If it is Judged that the safety switch 33 is in the ON-state, the program proceeds to Step 109 and other Steps to follow. If the judgment in Step 108 is made to the effect that the safety switch 33 is in the OFF-state, the program proceeds to Step 301. In Step 301, the required electric current supplying time period N' is renewed by subtracting the value of timer counter (TC) from the required electric current supplying time period N'. In the next Step 302, the value of the timer counter (TC) is brought back to "0", and then the program returns to the main program.

Figure 4:
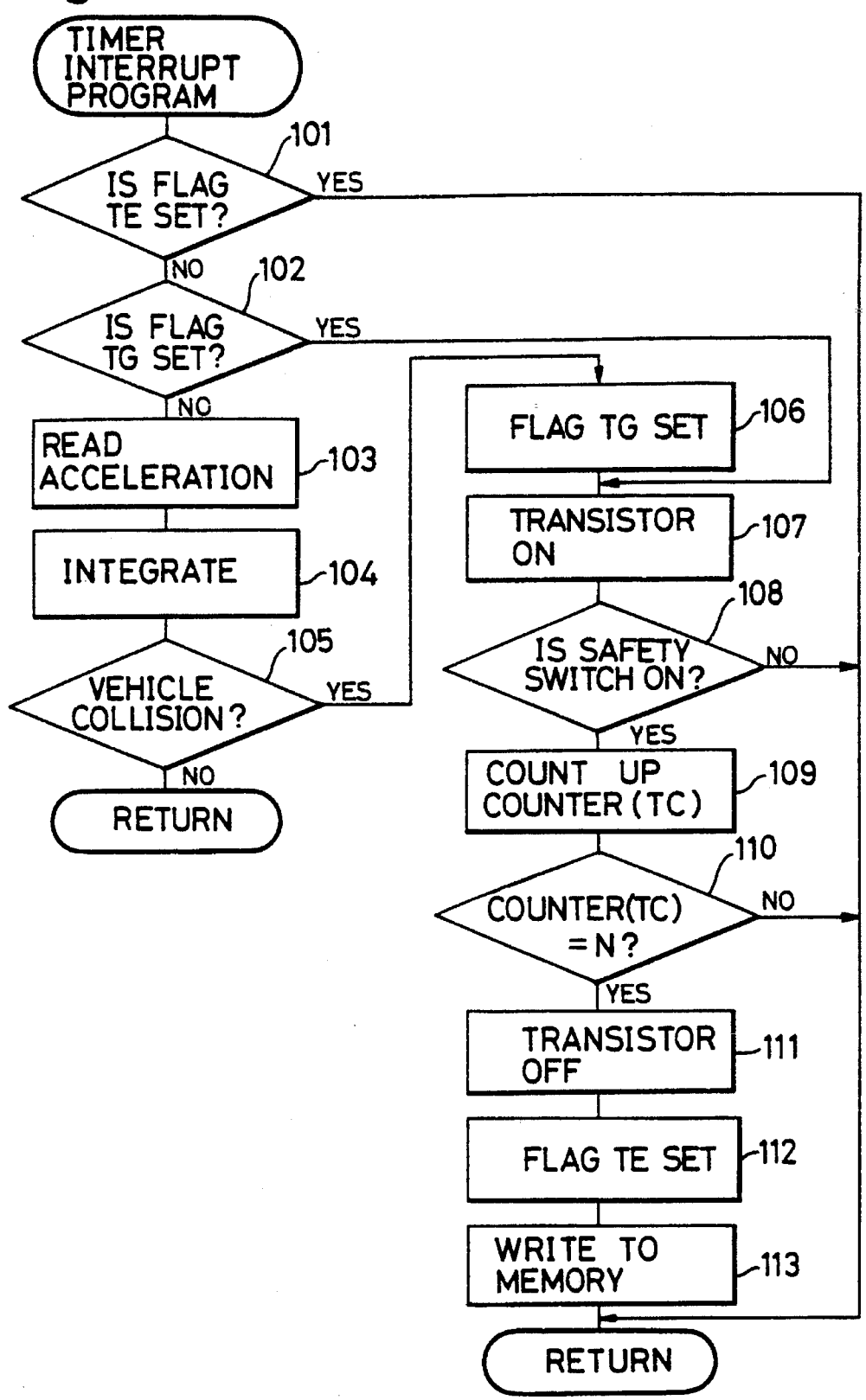
FIG. 4 is a flow chart of a program which is to be executed by a microcomputer in the above embodiment.
Figure 5:
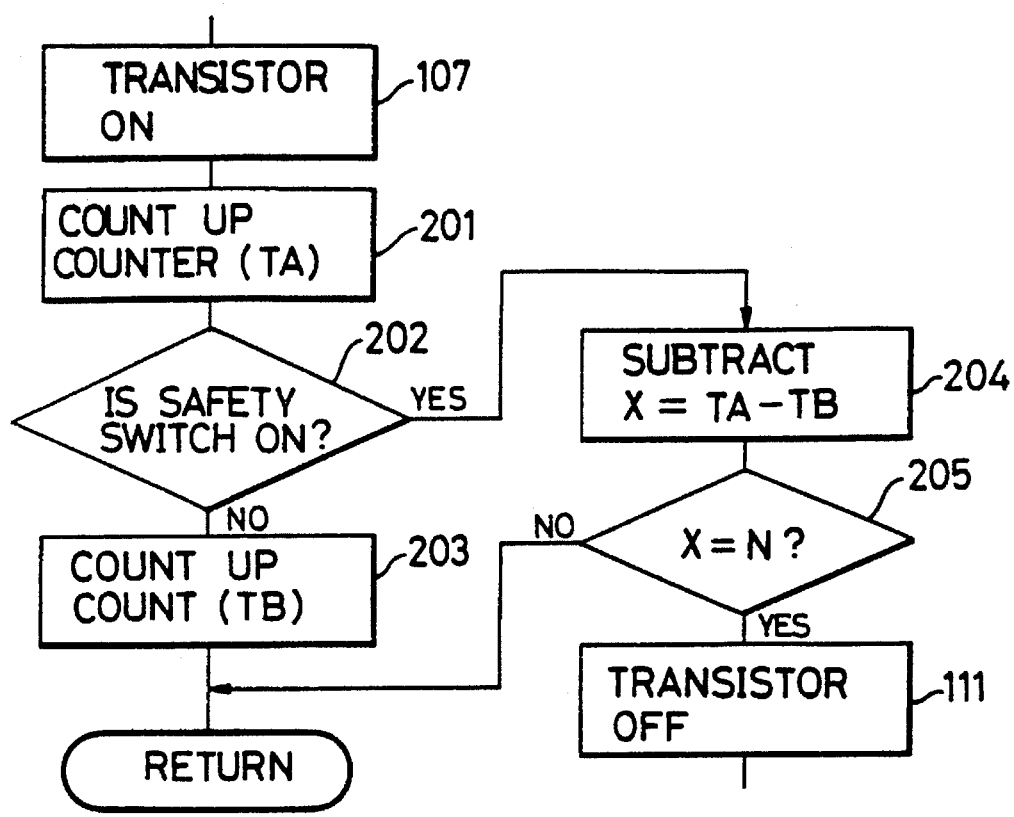
FIG. 5 is a flow chart showing another example of a program which is to be executed by the microcomputer.
Figure 6:
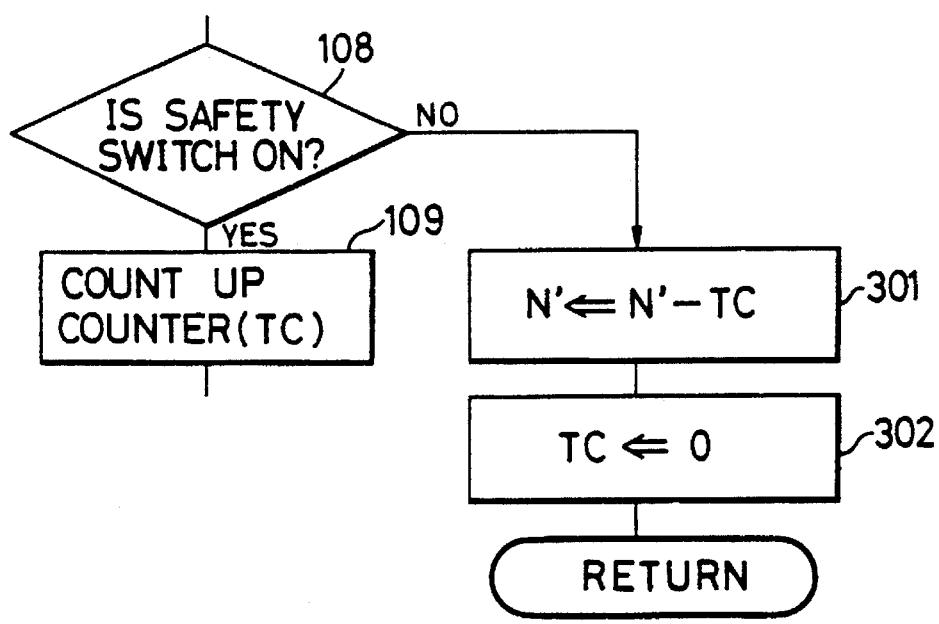
FIG. 6 is a flow chart showing still another example of a program which is to be executed by the microcomputer.

As described above, the timer counter (TC) of the embodiment of FIG. 6 does not count the total of the time period for supplying electric current to the squib 32 as in the embodiment of FIG. 4. This timer counter (TC) begins to count the time period from the time point where the output of the operation instruction signal and the ON-state of the safety switch 34 occur at the same time. When the safety switch 33 is switched over to the OFF-state from the ON-state, the above-mentioned required electric current supplying time period N' is renewed, and the value of the timer counter (TC) is cleared. When the safety switch 33 is turned on again, the timer counter (TC) begins to count the time period again. When the value of this timer counter (TC) reaches the renewed required electric current supplying time period N', the supply of electric current to the squib 32 is finished.

In the above embodiments, the present invention is applied to a control system of an air bag device. However, the present invention can of course be applied to a control system for a vehicle safety device such as a seat belt tightening device or the like. Also, any electric power remained in the condenser 20 may be used as a backup power source for component parts other than the microcomputer 40.

It may also be arranged such that in the case where the safety switch 33 is subjected to OFF-failure, the transistor 31 is turned off after the passage of a predetermined time even if the time period where both the transistor 31 and safety switch 33 are in the ON-state does not reach the preset time period, and an operation record of the system at that time is written in the non-volatile memory.

What is claimed is:

1. A method of controlling a vehicle safety device, comprising:

detecting acceleration acting on a vehicle and generating corresponding acceleration data;

judging whether or not a vehicle collision has occurred in accordance with the acceleration data;

outputting an operation instruction signal in response to said judging;

operating (i) a main switcher in response to the operation instruction signal, and (ii) a safety switch in response to an impact of the vehicle;

detecting an operating condition of the safety switch;

counting a time period during which (i) the operation instruction signal is being output, and (ii) the safety switch is detected as being in an ON-state;

providing the counted time period as an electric current supplying time period; and turning off the main switcher when the electric current supplying time period reaches a preset time period.

2. A method according to claim 1, wherein said counting of the time period occurs only when (i) the operation instruction signal is being output, and (ii) the safety switch is detected as being in the ON-state.

3. A method according to claim 1, wherein said counting comprises (i) counting a first time period during which the operation instruction signal is being output, and (ii) counting a second time period during which the operation instruction signal is being output and the safety switch is in the OFF-state;

and further comprising:

calculating the electric current supplying time period by subtracting the second time period value from the first time period value.

4. A method according to claim 1, further comprising:

renewing a remaining electric current supplying time period during which electric current is required, and counting a time period value from a time point where the output of the operation instruction signal and the ON-state of the safety switch are realized at substantially the same time, wherein said renewing renews the required electric current supplying time period by subtracting the time period value from the required electric current supplying time period at the time when the safety switch is switched over from the ON-state to an OFF-state;

clearing the time period value at that renewal time;

beginning to count the time period value when the safety switch is turned ON again; and turning off the main switcher when the time period value reaches the required electric current supplying time period.

\* \* \* \* \*